C. E. H. ARMBRUSTER.
REFLECTOSCOPE.
APPLICATION FILED DEC. 8, 1915.
1,190,619.
Patented July 11, 1916.
3 SHEETS—SHEET 1.
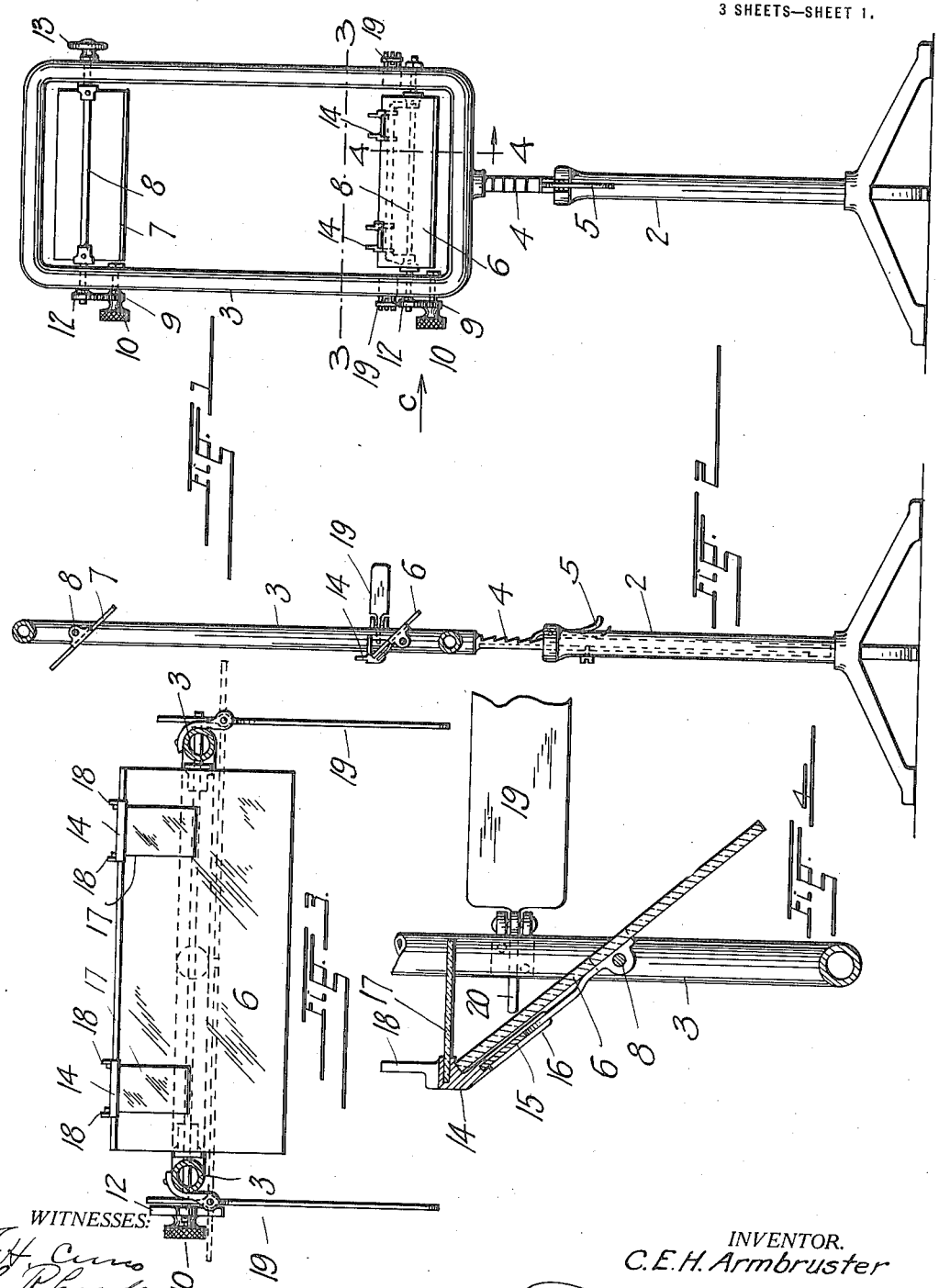
WITNESSES:
INVENTOR.
C. E. H. Armbruster
BY
ATTORNEY.

C. E. H. ARMBRUSTER.
REFLECTOSCOPE.
APPLICATION FILED DEC. 8, 1915.
1,190,619.
Patented July 11, 1916.
3 SHEETS—SHEET 2.
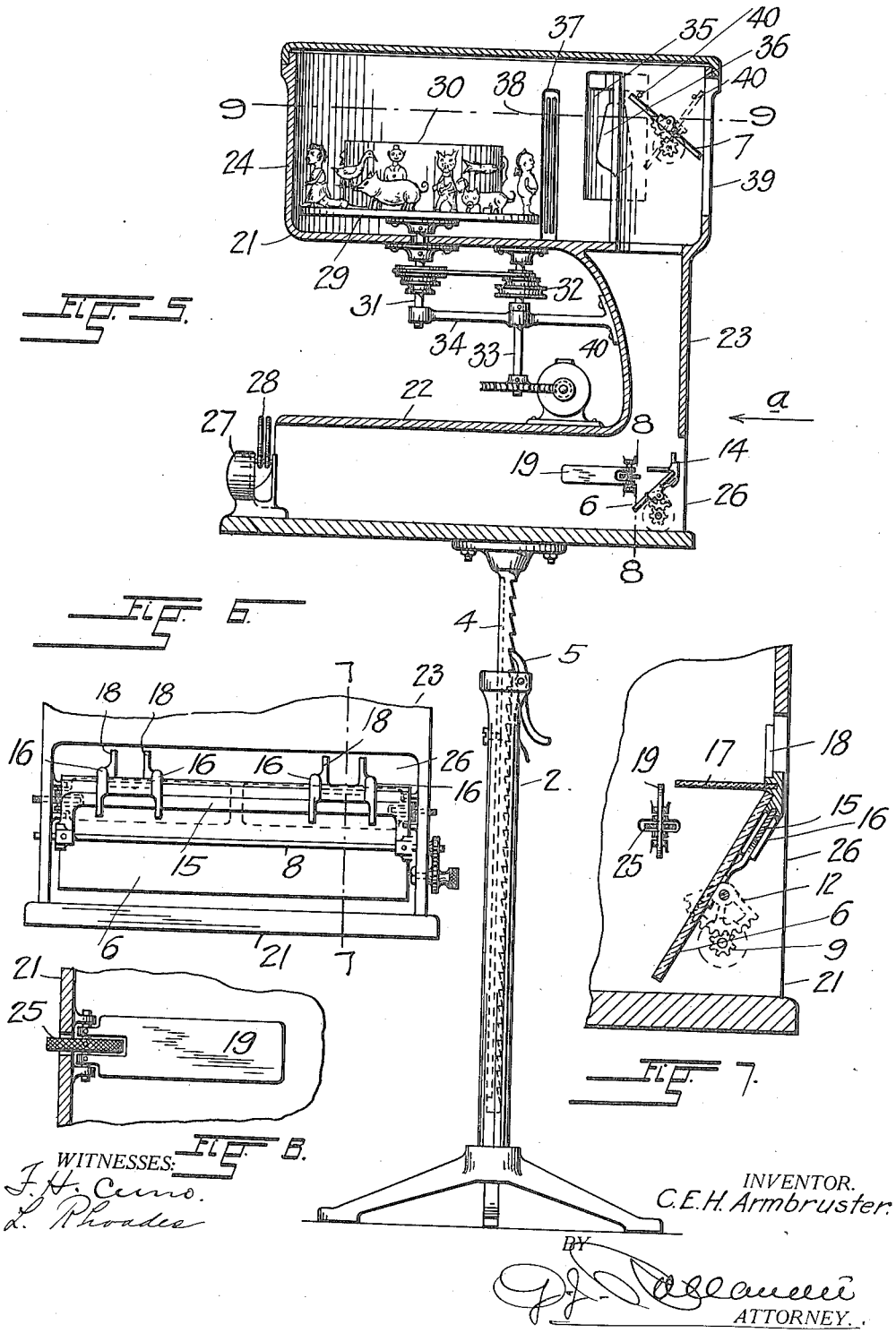

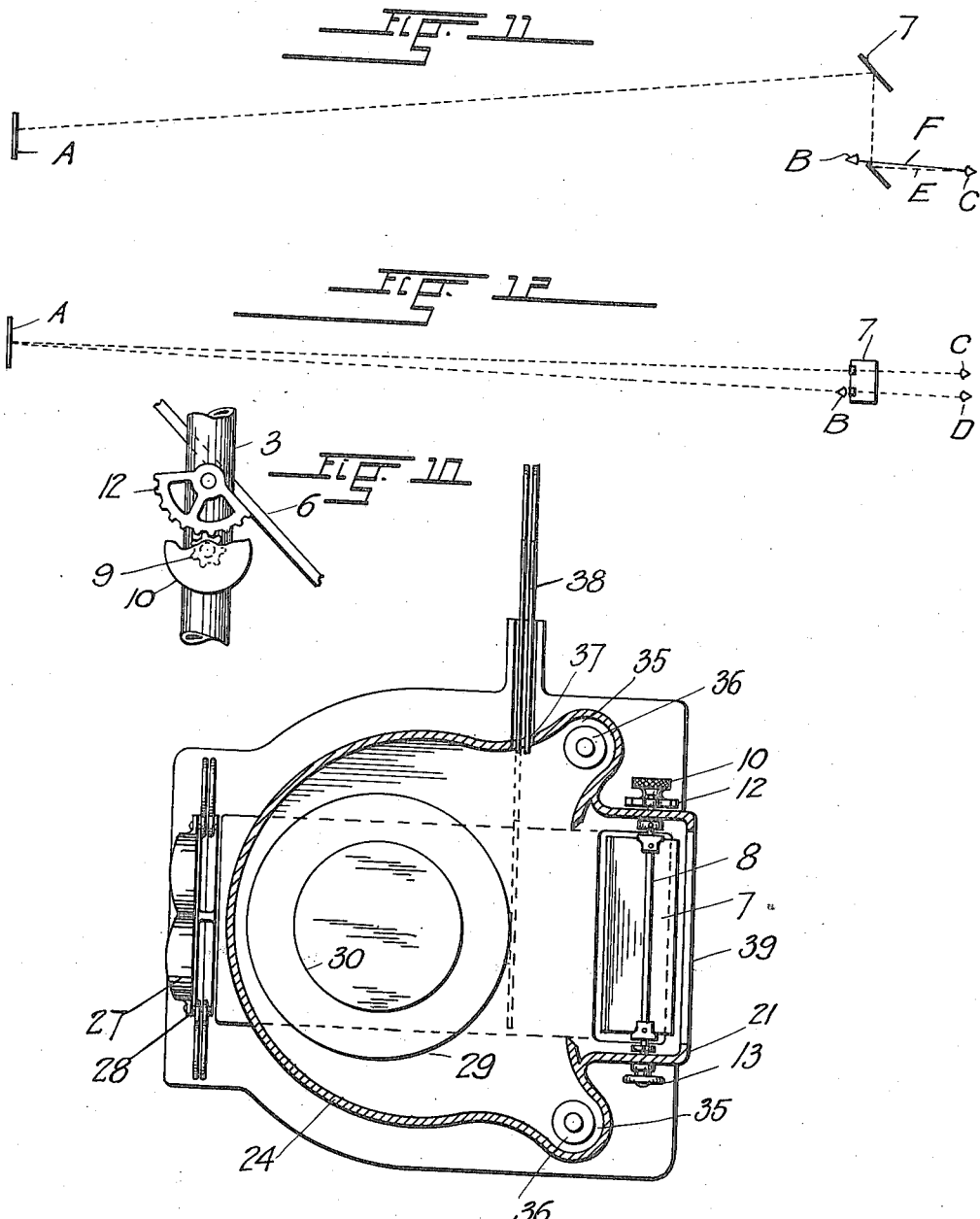

UNITED STATES PATENT OFFICE.

CHARLES E. H. ARMBRUSTER, OF DENVER, COLORADO.

REFLECTOSCOPE.

1,190,619.   Specification of Letters Patent.   Patented July 11, 1916.

Application filed December 8, 1915. Serial No. 65,749.

*To all whom it may concern:*

Be it known that I, CHARLES E. H. ARMBRUSTER, a citizen of the United States, residing at Denver, in the county of Denver and State of Colorado, have invented certain new and useful Improvements in Reflectoscopes, of which the following is a specification.

This invention relates to optical instruments for use in measuring refraction of the eye by means of the retinoscope.

As is well known to those skilled in the art to which this invention relates, the ideal condition in retinoscopic examination of the eye, is that in which the oculist looks into the eye of the patient along a line coincident with the visual axis of the same while the patient is looking at infinity to produce the condition of rest required for what is commonly known as the static test.

Heretofore, the patient whose eyes were being examined by means of the retinoscope, while sitting opposite the oculist was compelled to look at a distant object in a line passing either alongside or over the head of the observer, with the result that the oculist instead of looking along the visual axis of the eye directly at the fovea centralis thereof, as is necessary for a correct measurement of the refractive error, looked along a line at an angle to the said axis and at a point of the retina outside the fovea centralis. It follows that the refraction of the eye was not presented to the eye of the observer in its true condition, and that in consequence the refractive error of the eye was incorrectly measured.

It is the primary object of my invention to provide an instrument which permits the oculist while examining an eye by means of the retinoscope, to look thereinto along a line which closely approaches the visual axis without obstructing the line of vision of the eye while it is looking at infinity.

Another object of the invention is to provide in an instrument of the above described character, means which facilitate measurement of the eyes of children by engaging their attention through the medium of a moving object and thereby compel them to focus their eyes at a determinate point.

Still a further object of my invention resides in providing in connection with the instrument, devices which permit its use in a room whose length is insufficient to produce relaxation of the accommodation or focusing power of the eyes by focusing them upon a distant object.

The above and other objects, all of which will fully appear in the course of the following description, I attain by the mechanism shown in the accompanying drawings in the various views of which like parts are similarly designated, and in which—

Figure 1 is a face view of the instrument in its simplest form, Fig. 2, a sectional elevation of the same, Fig. 3, an enlarged section along the line 3—3, Fig. 1, Fig. 4, an enlarged section taken along the line 4—4, Fig. 1, Fig. 5, a sectional elevation of the instrument in the form which adapts it for use in examining the eyes of children and in making examinations within a limited space, Fig. 6, is an enlarged fragmentary end view, looking in the direction of the arrow A in Fig. 5, Fig. 7, a still further enlarged section along the line 7—7, Fig. 6, Fig. 8, a detail view of one of the shutters which are part of the instrument, Fig. 9, a transverse section along the line 9—9, Fig. 5, Fig. 10, a fragmentary enlarged side view of the mechanism for adjusting the mirrors of the instrument, looking in the direction of the arrow C, Fig. 1, Fig. 11, a diagrammatic view showing the lines of vision and paths of the reflected light in a vertical plane, in measuring refractive errors of the eye by means of the retinoscope in conjunction with the present invention, and Fig. 12, a similar view showing the lines of vision of both the patient and the observer in planes transverse to the vertical.

Referring first to the construction illustrated in Figs. 1 and 2 of the drawings, the reference numeral 2 designates a standard upon which a rectangular frame 3 is vertically adjustably mounted. The frame is to this end secured at the upper extremity of a toothed bar 4 which is slidingly fitted in a bore of the standard and which is held at a selected elevation by a dog 5 pivoted at the mouth of the standard to engage the teeth of the bar. Mounted respectively adjacent the upper and lower ends of the frame for movement about horizontal axes, are two mirrors 6 and 7 which provide the two reflective surfaces essential in the operation of my invention. The mirrors are mounted on rods 8 which provide trunnions for their pivotal connection with the frame. The upright side members o fthe frame are bored transversely to provide bearings for the trunnions of the mirrors, and one of the trunnions of each mirror connects exteriorly of the frame with a mechanism for its rotation to adjust the respective mirror to a selected angle of inclination.

The mechanisms above referred to, consist of a pinion 9 which is rotatably mounted on the frame in connection with a knob 10 for its manual rotation and which meshes with a segmental gear 12 attached at the end of one of the trunnions of the respective mirror. The upper mirror is furthermore provided with a knob 13 which is attached to the trunnion opposite to that to which the adjusting mechanism is applied, to facilitate the adjustment of the mirror through an angle of 90 degrees, as is required under certain conditions as will hereinafter more fully appear. Slidingly mounted upon the upper edge of the lower mirror of the instrument, are two finders 14 which in the operation are employed to locate the position of the eye of the observer in vertical planes with the axes of vision of the eyes of a patient looking at an image in the lower mirror.

The mirror 6 is provided for the support of the finders, with a longitudinally extending guide-bar 15 which is spaced from its back. The finders consist of a body which rests upon the upper edge of the mirror and which has a pair of downwardly extending slotted arms 16 for its sliding connection with the bar 15. Extending laterally from the body to overhang the mirror, is a small plate 17 of colored glass or other suitable material which is reflected in the mirror to assist the patient in maintaining the line of vision of the eye in a given direction. The finders are furthermore provided with a pair of upwardly projecting horns 18 forming a sight in alinement with the overhanging projection, which enables the oculist to place his eye with accuracy in a position in which his line of vision is in a vertical plane with the visual axis of the eye of the patient. To prevent confusion of the patient while one of the finders is being adjusted and thereby compel him to keep the visual axis of the respective eye in the proper direction, means are provided to temporarily obstruct the line of vision of the other eye of the patient. These means consist of shutters 19 which are pivotally mounted in brackets on the uprights of the frame to be moved about vertical axes in front of the mirror 6 in the path of the visual axes of the eyes of the patient centered upon an image in the mirror, the shutters being provided with handles 20 to facilitate their adjustment to and from their obstructive positions.

Having thus described my invention in its simplest form, its operation will be readily understood with reference to the diagrammatic views shown in Figs. 11 and 12 of the drawings. Premising that A designates a distant object at which the patient looks to place the eyes in a condition of rest, B the eye of the observer, and C and D the eyes of the patient, it will be seen that the patient when looking at the reflective surface provided by the slanting lower mirror 6 will observe the image of the object A which is reflected therein from the correspondingly slanting upper mirror 7. The observer positioned behind the lower mirror and looking across the upper edge thereof, is thus enabled to look into the patient's eye along a line in a vertical plane passing through the visual axis of said eye, without obstructing the line of sight of the patient while looking at infinity as is required to produce the condition of rest desired in retinoscopic examination of the eye. By turning the lower mirror about its horizontal pivotal axis until the image reflected from the upper mirror is as close to the upper edge of the lower reflective surface as is possible, the observer looking across the upper edge thereof into the eye of the patient is enabled to look along a line which very closely approaches the visual axis of the patient's eye, as shown in Fig. 11 of the drawings in which the line E represents an extension of the visual axis of the eye of the patient, and the line F designates the line of sight of the observer. After the lower mirror has been adjusted so that the patient sees the image of the distant object adjacent the upper edge of its reflective surface, the observer adjusts the finders 14 to enable him to move his own eye to a position in which its line of sight is accurately in a vertical plane with the axis of the eye of the patient he desires to examine. Before adjusting the respective finder, the observer obstructs by means of one of the shutters 19, the line of vision of the other eye of the patient, to prevent confusion, and then requests the patient to notify him when the image at which he is looking with the unobstructed eye, is in register with the reflection of the projection 17 on the finder which is being adjusted. When this condition is obtained, the observer placing his eye opposite to the sight of the adjusted finder, is looking along a line which is in a vertical plane of the visual axis of the patient's eye and which closely approaches the horizontal plane passing through the same, and the oculist is thus enabled to correctly and accurately determine the refractive error of the eye, since the ideal condition for retinoscopic examination of the eye, hereinbefore referred to, is substantially obtained. It will be readily understood that by adjust- ing the angle of inclination of the upper mirror, the image of a distant object may be reflected into the lower mirror, irrespective of the elevation of said object with relation to the eye of the patient.

In the construction shown in Figs. 5 to 9 inclusive, the pedestal 2 supports a casing 21 in which the mirrors 6 and 7 are mounted. This form of my invention is particularly adapted for use in examining the eyes of children, by the provision of a moving object which through the intermediary of the upper reflective surface is reflected in the lower mirror. The child looking in the mirror naturally keeps its eyes upon the moving object it sees reflected therein, and thus affords the oculist the opportunity of examing the eyes with the same accuracy as if the patient were an adult. The modified form of my invention is furthermore designed for use in the retinoscopic examination of the eyes of adults in rooms not long enough to allow the patient to look at infinity. The casing is formed to provide a horizontal sight-tube 22 in connection with the lower end of a vertical sight-tube 23 which at its opposite end connects with a forwardly projecting housing 24 for the moving object hereinbefore referred to. The lower mirror of the instrument is placed at the intersection of the two sight tubes, and is provided with adjusting mechanism, finders and shutters similar to those of the corresponding mirror in the first-described form. The gearing of the adjustment is in this construction placed exteriorly of the casing as shown in Fig. 6, and the shutters are operated by means of milled wheels 25 which are fixed on the pivot-pins upon which the shutters are mounted, and project through slots in the walls of the casing for their manipulation exteriorly of the same. The casing has rearward of the lower mirror, an opening 26 through which the oculist by looking across the upper edge of the mirror 6, examines the eye of a patient looking into the open front end of the horizontal sight-tube. A hood 27 mounted upon the base of the casing in front of the end opening of the sight-tube provides a rest for the head of the patient, and a trial frame 28 interposed between the hood and the end of the tube provides for the placement of lenses in front of the latter to produce the condition of rest or relaxation of the accommodating or focusing power which in the first-described form of my invention was obtained by the patient looking at infinity through the medium of a distant object reflected in the mirrors. The upper mirror is mounted at the upper end of the vertical sight-tube opposite the opening which connects it with the housing 24, the said mirror being provided with adjustments similar to those of the upper mirror in the other form of the invention.

When in the use of the apparatus it is desired to produce in the mirror at the intersection of the sight-tubes the image of an object disposed within the housing 24, the upper mirror 7 is placed at an angle to the lower mirror with its reflective surface facing the opening which connects the vertical sight tube with the housing. The casing is provided with an opening 39 opposite to the mirror to adapt the instrument for use in examining the eyes of a patient looking at infinity as in the use of the first-described instrument. The upper mirror is in this case rotated by means of the knob 13 through an angle of about ninety degrees to place its reflective surface in substantially parallel relation to the surface of the lower mirror and facing the opening 39. With the mirrors in this position the instrument illustrated in Fig. 5 may be used in a manner similar to that employed in the examination of eyes by means of the instrument shown in Figs. 1 and 2. To accurately determine the two operative positions of the mirror 7 in the casing of the instrument shown in Fig. 5, two stops 40 are provided to limit the movements of the mirror about its axis of rotation.

The moving object hereinbefore repeatedly referred to, consists of a platform 29 which rotates in the housing about a vertical axis and which supports in front of a concentric background 30, a number of dolls, toy animals, and other objects which will attract the attention of a child. A shaft 31 upon which the platform 29 is mounted, extends through an opening in the bottom of the casing and connects through the intermediary of a speed-reducing transmission mechanism 32 with the rotor of an electric motor 40 which for convenience is supported upon the horizontal sight-tube. The platform is rotatably supported upon a bearing placed around the opening in the bottom of the housing, and the shaft of the platform and the shaft 33 of the transmission mechanism extend through bearings on a bracket 34 secured exteriorly of the casing. The casing has at opposite sides of its vertical sight-tube, adjacent the opening which connects the same with the housing 24, recesses 35 in which are disposed a pair of incandescent lamps 36 which illuminate the rotary platform. The casing has rearward of one of the recesses, a vertical slot 37 for the admission of slides 38 to be interposed between the mirror 7 and the rotary platform. These slides which carry upon their faces opposite the mirror, letters or other symbols, are used when it is desired to employ the modified instrument in examining the eyes of adults, it being understood that the limited distance between the slides and the upper mirror, necessitates the use of lenses in front of the opening of the horizontal sight-tube to produce the required relaxation of the focusing power of the eye.

The manner of using the last-described instrument is otherwise identical to that of the instrument shown in Fig. 1. The oculist after the proper adjustments of the mirror, finders and shutters, makes a retinoscopic examination of the eye of a patient looking into the forward opening of the horizontal sight-tube by looking across the upper edge of the lower mirror through the opening in the casing rearward of the same.

Having thus described my invention what I claim and desire to secure by Letters-Patent is:

1. In an instrument of the character described, a pair of reflective surfaces placed one above the other and relatively positioned to reflect an image from the upper surface to the lower one, there being a space immediately above the said lower surface, through which an observer looks across the upper edge of the same, into the eye of a patient whose line of vision is centered in the reflected image of the lower surface.

2. In an instrument of the character described, a pair of pivotally mounted reflective surfaces placed one above the other and relatively positioned to reflect an image from the upper surface to the lower one, there being a space immediately above the said lower surface, through which an observer looks across the upper edge of the same, into the eye of a patient whose line of vision is centered in the reflected image of the lower surface.

3. In an instrument of the character described, a pair of pivotally mounted reflective surfaces placed one above the other and relatively positioned to reflect an image from the upper surface to the lower one, there being a space immediately above the said lower surface, through which an observer looks across the upper edge of the same, into the eye of a patient whose line of vision is centered in the reflected image of the lower surface, and micrometric means for the rotation of said surfaces to vary their angles of inclination.

4. In an instrument of the character described, a pair of reflective surfaces placed one above the other and relatively positioned to reflect an image from the upper surface to the lower one, and a finder adjustably mounted adjacent the upper edge of the lower surface, the said finder having a sight through which an observer looks across the said upper edge of the lower surface, into an eye of a patient whose line of vision is centered in the reflected image of the lower surface.

5. In an instrument of the character described, a pair of reflective surfaces placed one above the other and relatively positioned to reflect an image from the upper surface to the lower one, and a finder adjustably mounted adjacent the upper edge of the lower surface, the said finder including a projection overhanging the respective surface to be reflected therein, and a sight in alinement with said projection, through which an observer looks across the said upper edge of the lower surface, into an eye of a patient whose line of vision is centered in the reflected image of the lower surface.

6. In an instrument of the character described, a pair of reflective surfaces placed one above the other and relatively positioned to reflect an image from the upper surface to the lower one, a finder adjustably mounted adjacent the upper edge of the lower surface, the said finder including a projection overhanging the respective surface to be reflected therein, and a sight in alinement with said projection, through which an observer looks across the said upper edge of the lower surface, into an eye of a patient whose line of vision is centered in the reflected image of the lower surface, and an adjustable shutter adapted to obstruct the line of vision of the other eye of the patient.

7. In an instrument of the character described, a pair of reflective surfaces placed one above the other and relatively positioned to reflect an image from the upper surface to the lower one, and a pair of separately adjustable finders adjacent the upper edge of the lower surface, each having a sight through which an observer looks across the said upper edge of the lower surface, into an eye of a patient whose line of vision is centered in the reflected image of the lower surface.

8. In an instrument of the character described, a pair of reflective surfaces placed one above the other and relatively positioned to reflect an image from the upper surface to the lower one, a pair of separately adjustable finders adjacent the upper edge of the lower surface, each including a projection overhanging the respective surface to be reflected therein, and a sight alined with said projection through which an observer looks across the said upper edge of the lower surface, into an eye of a patient whose line of vision is centered in the reflected image of the lower surface, and adjustable shutters adapted to obstruct the line of vision of either eye of the patient.

9. In an instrument of the character described, a casing including horizontal and vertical sight-tubes, reflective surfaces at opposite ends of the vertical sight-tube, relatively positioned to reflect an image of the upper surface to the lower one, and an object disposed in the casing to be reflected in the said upper surface, the casing having an opening through which an observer looks across the upper edge of the lower surface into the eye of a patient whose line of vision is centered in the reflected image of the lower surface.

10. In an instrument of the character described, a casing including horizontal and vertical sight-tubes, reflective surfaces at opposite ends of the vertical sight-tube, relatively positioned to reflect an image of the upper surface to the lower one, and a moving object disposed in the casing to be reflected in the said upper surface, the casing having an opening through which an observer looks across the upper edge of the lower surface into the eye of a patient whose line of vision is centered in the reflected image of the lower surface.

11. In an instrument of the character described, a casing including horizontal and vertical sight-tubes, reflective surfaces at opposite ends of the vertical sight-tube, relatively positioned to reflect an image of the upper surface to the lower one, a movable object disposed in the casing to be reflected in said upper surface, and a motor on the casing for the movement of said object, the casing having an opening through which an observer looks across the upper edge of the lower surface into the eye of a patient whose line of vision is centered in the reflected image of the lower surface.

12. In an instrument of the character described, a casing including horizontal and vertical sight-tubes, reflective surfaces at opposite ends of the vertical sight-tube, relatively positioned to reflect an image of the upper surface to the lower one, an object disposed in the casing to be reflected in the said upper surface, and a trial frame at the front end of the sight tube for the support of lenses before an opening in the said end, the casing having an opening through which an observer looks across the upper edge of the lower surface into the eye of a patient whose line of vision is centered in the reflected image of the lower surface.

13. In an instrument of the character described, a casing including horizontal and vertical sight-tubes, reflective surfaces at opposite ends of the vertical sight-tube, relatively positioned to reflect an image of the upper surface to the lower one, an object disposed in the casing to be reflected in the said upper surface, and lamps in the casing for the illumination of the said object, the casing having an opening through which an observer looks across the upper edge of the lower surface into the eye of a patient whose line of vision is centered in the reflected image of the lower surface.

14. In an instrument of the character described, a casing including horizontal and vertical sight-tubes, reflective surfaces at opposite ends of the vertical sight-tube, relatively positioned to reflect an image of the upper surface to the lower one, and a moving object disposed in the casing to be reflected in the said upper surface, the said casing having a slot to admit a slide to a position between the said object and the upper mirror, and an opening through which an observer looks across the upper edge of the lower surface into the eye of a patient whose line of vision is centered in the reflected image of the lower surface.

15. In an instrument of the character described, a pair of reflective surfaces placed one above the other and relatively positioned to reflect an image from the upper surface to the lower one, and a moving object disposed to be reflected in the upper surface, there being a space immediately above the said lower surface through which an observer looks across the upper edge of the lower surface into the eye of a patient whose line of vision is centered in the reflected image of the lower surface.

16. In an instrument of the character described, a pair of reflective surfaces placed one above the other and relatively positioned to reflect an image from the upper surface to the lower one, and a rotary platform for the support of images or other objects, positioned for the reflection of said images or other objects into the upper surface, there being a space immediately above the said lower surface through which an observer looks across the upper edge of the lower surface into the eye of a patient whose line of vision is centered in the reflected image of the lower surface.

17. In an instrument of the character described, a pair of reflective surfaces placed one above the other and relatively positioned to reflect an image from the upper surface to the lower one, a rotary platform positioned for the reflection of objects supported thereon, into the upper surface, and means to mechanically rotate said platform, there being a space immediately above the said lower surface through which an observer looks across the upper edge of the lower surface into the eye of a patient whose line of vision is centered in the reflected image of the lower surface.

18. In an instrument of the character described, a pair of reflective surfaces placed one above the other and relatively positioned to reflect an image from the upper surface to the lower one, a moving object disposed to be reflected in the upper surface, and a slide adjustable to a position between the said object and the said upper mirror, there being a space immediately above the said lower surface through which an observer looks across the upper edge of the lower surface into the eye of a patient whose line of vision is centered in the reflected image of the lower surface.

19. In an instrument of the character described, a pair of pivotally mounted reflective surfaces placed one above the other and relatively positioned to reflect an image from the upper surface to the lower one, there being a space immediately above the said lower surface, through which an observer looks across the upper edge of the same, into the eye of a patient whose line of vision is centered in the reflected image of the lower surface, micrometric means for the movement of said means about their pivotal axes, and means for rotating one of the mirrors independent of said micrometric means and at greater velocity.

20. In an instrument of the character described, a casing including horizontal and vertical sight-tubes, and reflective surfaces at opposite ends of the vertical sight-tube, relatively positioned to reflect an image of the upper surface to the lower one, the said casing having an opening opposite the upper reflective surface and a second opening through which an observer looks across the upper edge of the lower surface into the eye of a patient whose line of vision is centered in the reflected image of the lower surface and the said upper surface being adjustable to positions in which it reflects into the lower mirror either an image of an object disposed in the casing or an image of an object appearing through the opening of the same.

21. In an instrument of the character described, a casing including horizontal and vertical sight-tubes, reflective surfaces at opposite ends of the vertical sight tube relatively positioned to reflect an image of the upper surface to the lower one, the said casing having an opening opposite the upper reflective surface and a second opening through which an observer looks across the upper edge of the lower surface into the eye of a patient whose line of vision is centered in the reflected image of the lower surface and the said upper surface having a rotary movement for its adjustment to positions in which it reflects into the lower mirror either an image of an object disposed in the casing or an image of an object appearing through the opening of the same, and stops on the casing to determine the said positions of the upper surface by limiting its rotary movement.

22. In an instrument of the character described, a pair of reflective surfaces placed one above the other and relatively positioned to reflect an image from the upper surface to the lower one, and a finder adjustably mounted adjacent the upper edge of the lower surface, the said finder including a projection of light absorptive material overhanging the respective surface to be reflected therein, and a sight in alinement with said projection, through which an observer looks across the said upper edge of the lower surface, into an eye of a patient whose line of vision is centered in the reflected image of the lower surface.

In testimony whereof I have affixed my signature in presence of two witnesses.

CHARLES E. H. ARMBRUSTER.

Witnesses:
G. J. ROLLANDET,
L. RHOADES.